R. C. NEVINS.
CULTIVATOR SPREADER.
APPLICATION FILED MAY 9, 1913. RENEWED MAR. 30, 1914.
1,095,514.
Patented May 5, 1914.
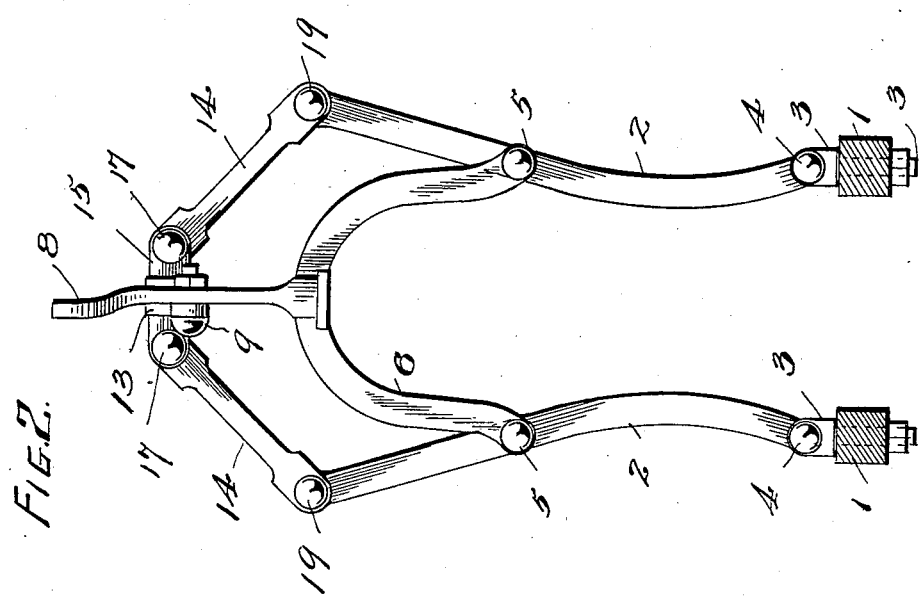
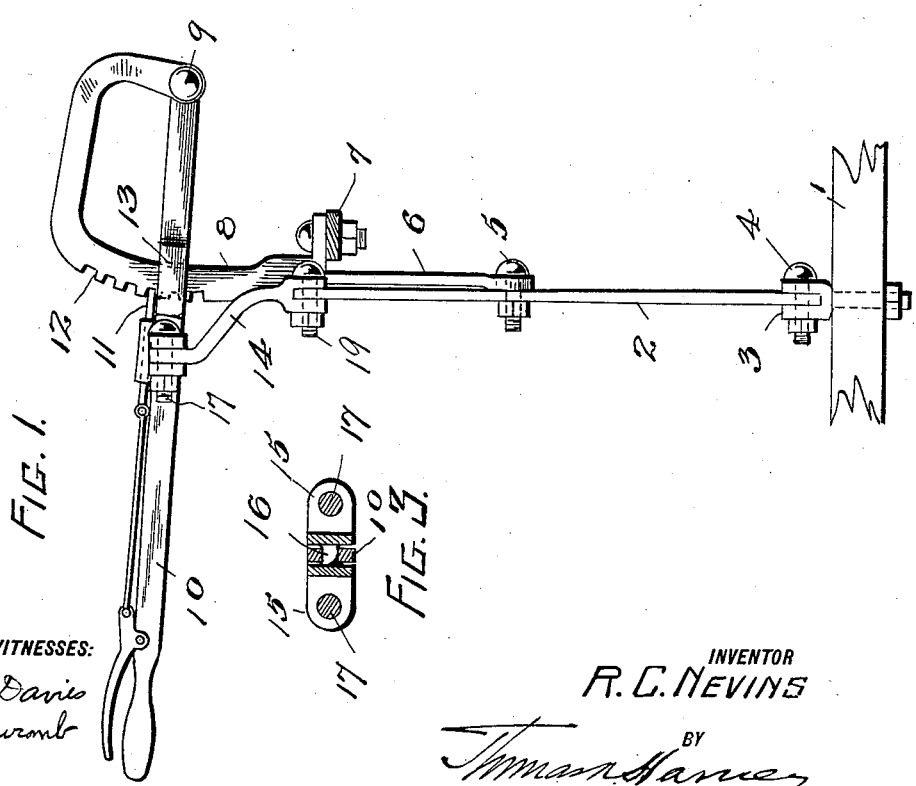
WITNESSES:
INVENTOR
R. C. NEVINS
BY
ATTORNEY

UNITED STATES PATENT OFFICE.

ROBINSON C. NEVINS, OF PROSPER, TEXAS, ASSIGNOR OF ONE-HALF TO MARVIN BUTTON, OF CELINA, TEXAS.

CULTIVATOR-SPREADER.

1,095,514.　　　　Specification of Letters Patent.　　Patented May 5, 1914.

Application filed May 9, 1913, Serial No. 766,500. Renewed March 30, 1914. Serial No. 828,141.

*To all whom it may concern:*

Be it known that I, ROBINSON C. NEVINS, a citizen of the United States, residing at Prosper, in the county of Collin and State of Texas, have invented certain new and useful Improvements in Cultivator-Spreaders, of which the following is a specification.

My invention relates to improvements in plow spreaders, and relates particularly to means for spreading the beams of plows or cultivators, in order to adjust the space between the plows of the implement.

The object of the invention is to improve the mechanism by which this adjustment is accomplished so that the operator or driver of the plow or cultivator may spread or draw together his plows at will without the necessity of checking his team or withdrawing the plows from the ground.

The invention is especially useful in cultivating cotton where in many cases the necessity arises for frequent adjustment of the plows, and this adjustment is accomplished with facility and ease.

The invention consists in certain novel combinations and arrangements of parts as will be hereinafter pointed out and claimed.

In the accompanying drawings I have illustrated one complete example of the physical embodiment of my invention constructed according to the best mode I have so far devised for the practical application of the principles thereof.

Figure 1 is a side elevation of the device involving my invention. Fig. 2 is an end view of the device of Fig. 1, the location of the view being transverse of a cultivating implement. Fig. 3 is a sectional detail view of a swivel part of the invention.

In the preferred embodiment of my invention the plow beams 1, 1, have pivoted thereto the spreader bars 2, 2, the connection being made by means of the eye-bolts 3, 3, and headed bolts 4, 4. These spreader bars are pivoted by means of the bolts 5, 5, at the respective ends of the arch bar 6, which is supported on a part of the implement frame as indicated in Fig. 1 by the numeral 7, and an upwardly extending bent arm 8 is fixed rigidly to the arch to form a supporting means for the actuating parts of the device. At its free end the arm is perforated to receive the bolt 9 which forms the pivot for the actuating lever 10, and the lever carries the customary pawl mechanism 11 to engage the teeth or rack 12 on the arm 8. The portion of the arm in which the rack teeth are cut curves on an arc struck from the pivot 9 as a center, and the lever 10 is provided with a slotted portion 13 which acts as a guide for the movement of the lever.

In Fig. 3 the connection between the links 14, 14 and the lever 10 is clearly illustrated. A double clip, as 15, 15 is swiveled by means of the bolt 16 in a perforation of the lever 10, and bolts 17, 17 form the pivots between the clips and links. The bolts 19, 19, perform the functions of pivots connecting the upper ends of the spreader bars 2, 2, with their links 14, 14.

It will be noted that the arch bar which supports the operating device is rigidly attached to a part of the implement frame and is well supported. The operation of the device will be apparent, but it should be noted especially that the operator has the advantage of the downward pull on the lever 10 when it is to draw the plows of the cultivator together, thereby insuring more efficiency when the greater strength or exertion is required.

The lever may be turned or swung on its pivot by first withdrawing the pawl from the rack and then if it is desired to draw the beams nearer together a downward pressure on the lever spreads the pivots 19 of the links and spreader bars, the bars swing on their pivots 5 and the lower ends of the bars draw the beams 1 toward each other. To separate the beams the reverse movement is necessary. In either use of the lever the movement is free and easy and the adjustment is accomplished with facility. The swivel 16, and pivots 17 permit a universal joint to allow for the swing of the lever 10, and the movement, either inwardly or outwardly of the separator bars, on their pivots of the rigid arch, is free and smooth.

While I have illustrated one complete and specific form of my invention, it will of course be understood that I may make changes and alterations within the scope of my claims without departing from the spirit of my invention.

Having thus fully described my invention, what I claim is:—

1. The combination with a rigidly supported arch bar and adjustable beams, of spreader bars pivoted on the arch bar and pivoted to the beams, a supporting arm rigid with the arch bar, a lever pivoted on the supporting arm, and links connecting said lever with the ends of the spreader bars.

2. The combination with a rigidly supported arch bar and adjustable beams, of a pair of spreader bars pivoted on the arch and to the beams, a rigid arm attached to the arch bar, a lever pivoted in the arm, a double clip swiveled in said lever and a pair of links connecting said clip with the spreader bars.

3. The combination with a rigidly supported arch bar and adjustable beams, of a pair of spreader bars pivoted on the arch bar and to the beams, a rigid arm attached to the arch bar and formed with rack teeth, a lever pivoted in the arm, a double clip swiveled in the lever, a pair of links connecting said clip with the spreader bars, and a pawl device for engaging said teeth.

In testimony whereof I affix my signature in presence of two witnesses.

ROBINSON C. NEVINS.

Witnesses:
T. H. FORD,
LEE B. NEWSOM.

Copies of this patent may be obtained for five cents each, by addressing the "Commissioner of Patents, Washington, D. C."